Figure 1:
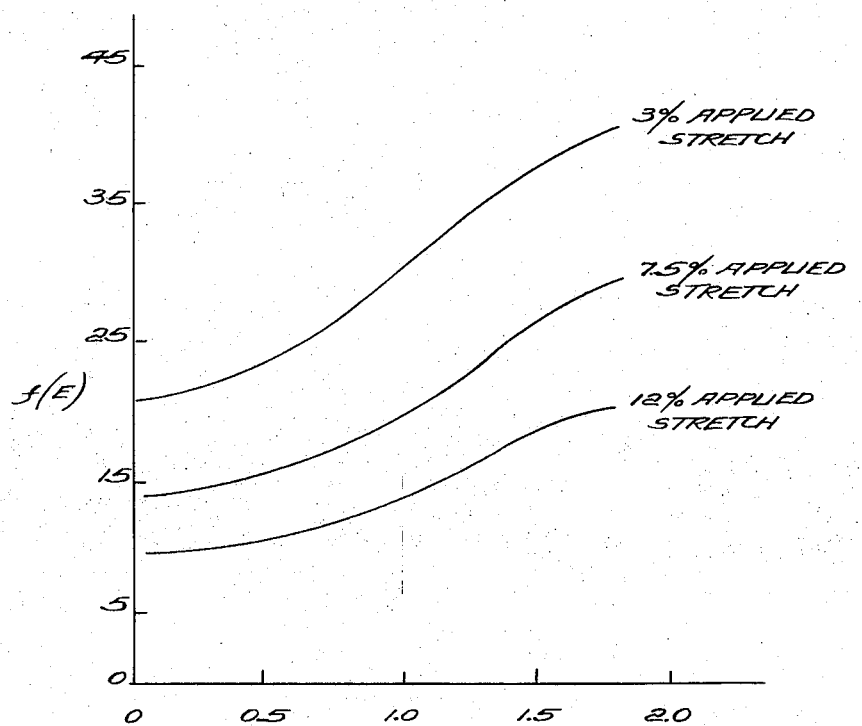

United States Patent Office 3,307,962
Patented Mar. 7, 1967

3,307,962
PROCESS FOR TREATING NYLON CORD WITH AN ADHESIVE LATEX
Henry Benjamin Hardy, Jr., Wilmington, Del., assignor to E. I. du Pont de Nemours and Company, Wilmington, Del., a corporation of Delaware
Filed Dec. 16, 1964, Ser. No. 418,849
1 Claim. (Cl. 117—7)

This application is a continuation-in-part of my copending application, Serial No. 176,820, filed March 1, 1962, now abandoned. The invention relates generally to the preparation of nylon cords for use as reinforcements in pneumatic tires and, more particularly, to preparatory procedures leading to improvements in those cord properties which contribute to the "flat-spotting" tendency of such tires.

"Flat-spotting" is a temporary phenomenon exhibited by tires reinforced with conventional nylon cords and is characterized by a flatness which develops on the tire surface in contact with the road as a tire cools after use. When the tire is again placed in use, this flatness persists temporarily and a thumping sound is audible. The phenomenon has been attributed, at least in part, to such visco-elastic properties as the relatively low dimensional stability, low modulus, and high growth of conventional polyamide yarns.

It has long been recognized that any appreciable reduction in flat-spot depth would remove the principal objection to the otherwise highly advantageous use of nylon in tire reinforcement cords. Such a reduction has been accomplished with cords prepared from recently developed melt blends of polyhexamethylene adipamide (95–50%) with a complementary amount of either polyhexamethylene isophthalamide, polyhexamethylene 5-t-butyl isophthalamide or a copolymer of hexamethylene 5-t-butyl isophthalamide and hexamethylene isophthalamide (1.5–30%). These cords, when fabricated into tires, have visco-elastic properties corresponding to an acceptable flat-spot depth.

However, when cords prepared from one of the melt blends are hot-stretched conventionally, at a temperature which approximates the melting point of the particular cord material, they lose considerably more strength than do conventional nylon cords similarly hot-stretched. Furthermore, the conventional practice of only partially drying the cords before stretching is particularly deleterious in that heat-stretching, at a temperature which approximates the melting point of the cord material and with a significant percentage of moisture present in said cords, produces an unacceptable product.

The most important object of the present invention is to increase the utility of tire cords prepared from a melt blend of polyamides by the provision of process features, the effect of which is to improve and stabilize those visco-elastic properties of the cords which are related to the "flat-spotting" phenomenon.

A more specific object of the invention is to provide a process for treating cords prepared from particular melt blends in such a manner that the treated cords are characterized by high break strength, substantially increased thermal stability, an initial modulus at 75° C. in excess of 20 grams per denier, a hot-to-cold modulus ratio of at least 0.5, a moisture regain of less than 1%, and an $f(E)$ of not more than 15.

These and other objectives are accomplished by passing twisted cords prepared from filaments spun from any of the above-mentioned melt blends through an adhesive latex dip and then immediately to a heat-treatment stage, stretching the cords from 6–20% and heating the stretched cords for from 10–120 seconds by maintaining the treatment zone at a temperature of from 428–300° F. After treatment, the cords are wound on a take-up device. In those situations where lower cord shrinkage properties are desired, the winding step is preceded by annealing and relaxing stages in which the cords are successively treated at temperatures above and below that employed in the dip-stretching stage. In the annealing stage, operable limits for the three process varables include a temperature range of from 480–400° F. (provided that the annealing temperature exceeds the temperature of the previous stretching stage by at least 50° F.), an applied stretch of from −3% to +3% (thereby preventing excessive shrinkage or elongation) and a residence time of from 3–10 minutes. For the relaxing stage, a temperature of from 360–320° F., an applied tension of 0–0.1 gram per denier and a residence time of 30–90 seconds are operable. The preferred process of this invention (because of the significantly higher break strength attained) is a two-stage treatment wherein the cords pass through a drying zone immediately after passing through the adhesive dip and before entering the heat-treatment zone. In the drying zone, a temperature of from 220–320° F., an applied stretch of −1% to +1% and a residence time of 90 seconds to 240 seconds are operable. After this two-stage treatment, the cords are wound on a take-up device, i.e., no annealing or relaxing stages are employed.

It should be noted that, in all cases, adhesive dipping must precede heat-stretching (for best dip penetration) and cords must enter a heat zone immediately after the adhesive dip to avoid a moisture content of more than 1.5% for any significant length of time. Furthermore, heat stretching is carried out at a temperature that is at least about 70° F. less than the melting point of the melt-blend composition. In general, to attain equivalent cord properties, a higher treatment temperature must be employed for shorter treatment times and/or lower applied stretch levels, and vice versa.

Figure 2:
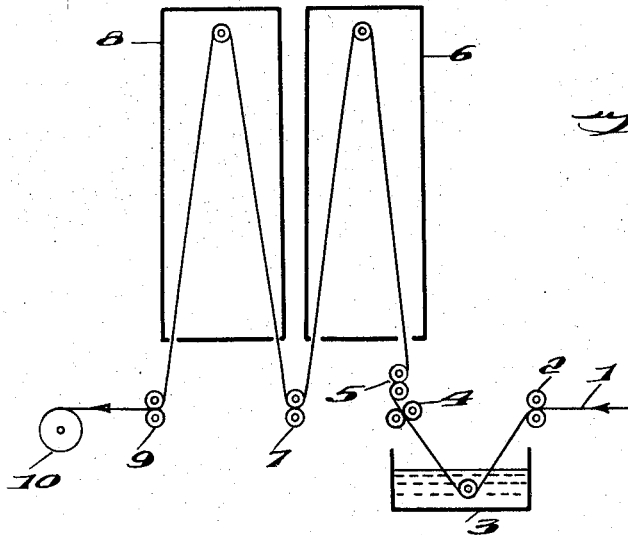

The process is described and exemplified hereinafter, with reference to the accompanying drawing wherein
FIGURE 1 shows the relationship of moisture regain and $f(E)$ factor; and
FIG. 2 is a schematic representation of the preferred two-stage treatment described in Example III.

As shown in FIG. 2, tire cords 1 pass through rolls 2 of a continuous let-off and tension system, through an adhesive dip 3, through rolls 4 of a quetsch roll system, located directly above the adhesive dip 3, and then immediately through tension rolls 5 located directly below drying oven 6. The distance between rolls 4 and 5 and the distance between rolls 5 and oven 6 shall be the minimum required for mechanical clearance. Cords 1 leave oven 6, pass through a second set of tension rolls 7 into a heat-stretch oven 8, then through final tension rolls 9 and finally to a take-up device 10.

Where modulus is reported herein, it is the modulus of elasticity, i.e., the Young's modulus, of the cord. In the hot-to-cold modulus ratio, the moduli at 75° C. and 25° C. are employed. Higher values for the hot modulus and/or hot-to-cold modulus ratio of a cord correlate with a lesser flat spot depth. Similarly, the $f(E)$ is a cord elongation factor which correlates with flat spot depth. Where reported herein, $f(E)$ is computed from the expression $f(E) = E_1(E_2 - E_1)$ wherein $E_1$ is the cord elongation at 10 pounds tension at 25° C. and $E_2$ is the cord elongation at 10 pounds tension at 75° C.

Moisture regain, as defined by ASTM Designation D-123-58, is the value of the fraction $$\frac{\text{total weight of moisture in the sample}}{\text{bone dry weight of sample}}$$

The following examples are illustrative of the highly advantageous and useful results which can be accomplished ed in practicing the one, two and three stage processes of this invention.

*Example I*

A tire cord, fabricated from filaments consisting essentially of an 80/20 melt blend (M.P. = 482°F.) by weight of polyhexamethylene adipamide and polyhexamethylene isophthalamide (British specification 918,637), is passed from a continuous let-off and tension system through an adhesive dip of resorcinol formaldehyde latex, through a quetsch roll system and then immediately to a heat treatment zone operated at 392° F. In that zone, it is subjected to a 12% applied stretch for 20 seconds. The treated cord is passed through a tension roll system and wound on a take-up device. Identical cords are treated similarly at 392° F. but at 3% and 7.5% applied stretch for 20 seconds. At 392° F. and 7.5% applied stretch, other identical cords are treated similarly but for 60 and 100 seconds. The heating medium is recirculated air.

Properties of the heat-treated, desiccated cords are reported in Table I. FIG. 1 shows the relationship of $f(E)$ to moisture regain for applied stretches of 3, 7.5, and 12%, all for 20 seconds at 392° F. The graph also shows that an acceptable $f(E)$ can be achieved only by stretching the cords in excess of 6% in the heat treatment zone.

TABLE I

| Temp., °F. | Applied Stretch (Percent) | Time (secs.) | Hot Cord Modulus, at 75° C. (g.p.d.) | Cold Cord Modulus, at Room Temp. (g.p.d.) | Modulus Ratio, Hot/Cold | $f(E)$ | Break Elongation (Percent) |
|---|---|---|---|---|---|---|---|
| 392 | 3 | 20 | 27.2 | 37.5 | 0.72 | 20.5 | 16.3 |
| 392 | 7.5 | 20 | 30.4 | 42.4 | 0.72 | 13.6 | 13.8 |
| 392 | 12.0 | 20 | 33.2 | 46.2 | 0.72 | 8.6 | 12.3 |
| 392 | 7.5 | 60 | 29.8 | 41.2 | 0.72 | 10.2 | 14.3 |
| 392 | 7.5 | 100 | 29.3 | 39.5 | 0.74 | 8.6 | 14.6 |
| 302 | 7.5 | 20 | 25.4 | 37.8 | 0.67 | 14.9 | 15.5 |
| 420 | 7.5 | 20 | 30.4 | 41.6 | 0.73 | 10.7 | 12.8 |

*Example II*

A tire cord, fabricated from filaments consisting essentially of an 80/20 melt blend by weight of polyhexamethylene adipamide and polyhexamethylene isophthalamide, is passed from a continuous let-off and tension system through an adhesive dip of resorcinol formaldehyde latex, through a quetsch roll system and then immediately to a heat treatment zone operated at 375° F. In that zone, it is subjected to a 12% applied stretch for one minute. From the heating zone, the cord passes through a tension roll system to an annealing zone operated at 475% F. where it is subjected to 3% applied stretch for 7 minutes. From this second zone, the cord passes through a second tension roll system to a relaxing zone operated at 350° F. where it is subjected to a tension of 0.1 gram per denier for 1 minute. From this third zone, the cord passes through a third tension roll system and is wound on a take-up device. In all three zones, the heating medium is recirculated air. Properties of the treated, desiccated cords are reported in Table II.

TABLE II

|  | After Completing First Stage | After Completing Three Stages |
|---|---|---|
| Break elongation (percent) | 12.5 | 18.7 |
| Modulus at room temp. (grams/denier) | 57.0 | 44.2 |
| Modulus at 75° C. (grams/denier) | 37.5 | 30.7 |
| Modulus Ratio (hot/cold) | 0.66 | 0.70 |
| $f(E)$ | 5.7 | 11.5 |

From the above comparisons, it is apparent that a lower $f(E)$ and a higher modulus are achieved in the one-stage process of Example I. It is also apparent that an acceptable $f(E)$ and a good balance of other properties can be achieved by employing that one stage, dip-stretching process in advance of annealing and relaxing stages. In this respect, it has been found that the percent free shrinkage and the constant length shrink tension properties are substantially reduced when the dip-stretching stage is followed by annealing and relaxing stages.

*Example III*

Tire cords are fabricated from filaments consisting essentially of (1) and 80/20 melt blend of polyhexamethylene adipamide and polyhexamethylene isophthalamide, and (2) an 80/20 melt blend (M.P. 482° F.) of polyhexamethylene adipamide and polyhexamethylene 5-t-butyl isophthalamide. As shown schematically in FIG. 2, these tire cords are passed from a continuous let-off and tension system through an adhesive dip of resorcinol formaldehyde latex, through a quetsch roll system, through a tension roll system, and then to a drying zone at 300° F. In said drying zone the cords are dried for 2 minutes at substantially constant length, so that the moisture content is less than 1.0%. The dried cords are then passed through a tension roll system and next to a heat treatment zone at 375° F. In said heat-treatment zone the cords are subjected to 11% applied stretch 36 seconds. Recirculated hot air is the heating medium in both zones. The treated cords are then passed through a tension roll system and wound up on a take-up device. Various properties are tabulated in Table III. Similar results are attained with cords prepared from an 80/20 melt blend of polyhexamethylene adipamide and a copolymer of hexamethylene 5-t-butyl isophthalamide with hexamethylene isophthalamide. The tabulated data show that the preferred two-stage process of this invention provides both a low $f(E)$ and a good balance of other cord properties. Furthermore, cords treated with a two-stage treatment have significantly greater break strength than cords treated in only one stage, because the two-stage treated cords are effectively dry cords before being stretched.

TABLE III

|  | Cord (1) | Cord (2) |
|---|---|---|
| Hot Cord Modulus at 75° C. (g.p.d.) | 38.8 | 38.2 |
| Cold Cord Modulus at 25° C. (g.p.d.) | 52 | 48 |
| Modulus Ratio (hot/cold) | 0.74 | 0.80 |
| $f(E)$ | 6.4 | 6.9 |
| Break Elongation (percent) | 13.2 | 13.0 |
| Break Strength (lbs.) | 27.7 | 27.3 |
| Tenacity (g.p.d.) | 7.3 | 6.8 |

The break strength of the greige cord 1, is 28.8 lbs. so that the loss in break strength is only 3.8%. However, when said cords are similarly processed but using a heat-stretching temperature of 440° F., the break strength loss is an unacceptable 14%; and, at 450° F. heat-stretch, the loss is 16%.

Although each exemplified heating step was accomplished by the recirculation of heated air in an oven, any suitable heating medium, e.g., radiant heat or an inert fluid system, may be employed. It is apparent that other changes and variations may be adopted without departing from the spirit of the present invention which is accordingly intended to be limited only by the scope of the appended claim.

Having thus described the invention, what is claimed as new and desired to be secured by Letters Patent is:

A process comprising the steps of: advancing a twisted cord prepared from nylon filaments from an adhesive latex dip to and through a heat treatment zone; stretching the cord from 6–20%, in its advance through said zone, by applying tension thereto; heating the stretched cord for from 10–120 seconds by maintaining said zone at a temperature of from 400–300° F.; advancing the stretched cord through an annealing zone maintained at 480–400° F. for 3–10 minutes with from −3 to +3% stretch applied thereto; advancing the annealed cord through a relaxing zone maintained at 360–320° F. for 30–90 seconds with a tension of from 0–0.1 gram/denier applied thereto; and winding the relaxed cord on a take-up device, said nylon being selected from the group consisting of melt blends of (1) polyhexamethylene adipamide with polyhexamethylene isophthalamide, (2) polyhexamethylene adipamide with polyhexamethylene 5-t-butyl isophthalamide and (3) polyhexamethylene adipamide with a copolymer of hexamethylene isophthalamide and hexamethylene-5-t-butyl isophthalamide.

References Cited by the Examiner

UNITED STATES PATENTS

| | | | |
|---|---|---|---|
| 2,679,088 | 5/1954 | Meherg et al. | 117—7 X |
| 2,995,178 | 8/1961 | Saulino et al. | 117—7 X |
| 3,050,820 | 8/1962 | Pamm | 117—7 X |

FOREIGN PATENTS 771,946  4/1957  Great Britain.

WILLIAM D. MARTIN, *Primary Examiner.*

H. W. MYLIUS, *Assistant Examiner.*